United States Patent
Zhang (10) Patent No.: US 11,989,864 B2
(45) Date of Patent: May 21, 2024

(54) METHOD AND APPARATUS FOR PROCESSING IMAGE, AND STORAGE MEDIUM

(71) Applicants: BEIJING XIAOMI MOBILE SOFTWARE CO., LTD., Beijing (CN); BEIJING XIAOMI PINECONE ELECTRONICS CO., LTD., Beijing (CN)

(72) Inventor: Peng Zhang, Beijing (CN)

(73) Assignees: BEIJING XIAOMI MOBILE SOFTWARE CO., LTD., Beijing (CN); BEIJING XIAOMI PINECONE ELECTRONICS CO., LTD., Beijing (CN)

(*) Notice: Subject to any disclaimer, the term of this patent is extended or adjusted under 35 U.S.C. 154(b) by 403 days.

(21) Appl. No.: 17/515,431

(22) Filed: Oct. 30, 2021

(65) Prior Publication Data
US 2022/0343474 A1    Oct. 27, 2022

(30) Foreign Application Priority Data
Apr. 26, 2021   (CN) .......................... 202110455875.0

(51) Int. Cl.
| G06K 9/00 | (2022.01) |
| G06F 18/25 | (2023.01) |
| G06T 5/50 | (2006.01) |
| G06T 5/92 | (2024.01) |

(52) U.S. Cl.
CPC .............. G06T 5/92 (2024.01); G06F 18/251 (2023.01); G06T 5/50 (2013.01)

(58) Field of Classification Search
CPC .... G06T 5/92; G06T 5/50; G06T 5/90; G06T 2207/10144; G06T 2207/20016; G06T 2207/20208; G06T 2207/20221; G06T 7/90; G06T 7/30; G06T 2207/20021; G06F 18/251
See application file for complete search history.

(56) References Cited

U.S. PATENT DOCUMENTS

| 9,600,741 B1 | 3/2017 | Su et al. |
| 10,122,943 B1 * | 11/2018 | Chen ...................... H04N 23/45 |

(Continued)

FOREIGN PATENT DOCUMENTS

| CN | 112106352 A | 12/2020 |
| JP | 2009224901 A | 10/2009 |

(Continued)

OTHER PUBLICATIONS

Mertens, T., J. Kautz, and F. Van Reeth. "Exposure Fusion: A Simple and Practical Alternative to High Dynamic Range Photography." Computer Graphics Forum. vol. 28. No. 1. Wiley, 2009. (Year: 2009).*

(Continued)

*Primary Examiner* — Andrew M Moyer
(74) *Attorney, Agent, or Firm* — COZEN O'CONNOR (57) ABSTRACT

A method for processing an image includes: creating M first image sets based on M image frames to be processed; determining a fusion weight for each sub-image located in each layer in each first image set based on brightness information of each image frame; fusing sub-images located in each same layer in the M first image sets based on the fusion weight, to obtain N fused sub-images arranged in layers based on the preset order; adjusting a brightness of at least one fused sub-image of the N fused sub-images based on a preset brightness adjustment parameter; and obtaining a target image based on the fused sub-image after adjustment.

20 Claims, 5 Drawing Sheets

(56) References Cited

U.S. PATENT DOCUMENTS

2011/0147588 A1* 6/2011 Chaudhuri .............. G06T 5/50
                                                    250/334
2013/0335596 A1  12/2013 Demandolx et al.
2021/0042941 A1*  2/2021 Zhen .................. G06T 7/215

FOREIGN PATENT DOCUMENTS

JP        2014068330 A    4/2014
WO    WO 2018136373 A1    7/2018

OTHER PUBLICATIONS

Wang, Jinhua, De Xu, and Bing Li. "Exposure fusion based on steerable pyramid for displaying high dynamic range scenes." Optical Engineering 48.11 (2009): 117003-117003. (Year: 2009).*

Shen, Jianbing, et al. "Exposure fusion using boosting Laplacian pyramid." IEEE Trans. Cybern. 44.9 (2014): 1579-1590. (Year: 2014).*

Indian Patent Application No. 202144051782, Office Action dated Dec. 14, 2022, 7 pages.

Korean Patent Application No. 10-2021-0145373 Office Action dated Jan. 11, 2023, 5 pages.

Korean Patent Application No. 10-2021-0145373, English translation of Office Action dated Jan. 11, 2023, 6 pages.

Mertens, T. et al. "Exposure Fusion: A Simple and Practical Alternative to High Dynamic Range Photography" Computer Graphics Forum; vol. 28 (2009) No. 1; pp. 161-171.

Qu, Z et al. "An improved algorithm of multi-exposure image fusion by detail enhancement" Multimedia Systems (2021) 27; pp. 33-44.

Japanese Patent Application No. 2021-177390, Notice of Allowance dated Jan. 6, 2023, 3 pages.

Japanese Patent Application No. 2021-177390, English translation of Notice of Allowance dated Jan. 6, 2023, 2 pages.

* cited by examiner

METHOD AND APPARATUS FOR PROCESSING IMAGE, AND STORAGE MEDIUM

CROSS-REFERENCE TO RELATED APPLICATIONS

This application is based upon and claims priority to Chinese Patent Application 202110455875.0, filed on Apr. 26, 2021, the entire contents of which are incorporated herein by reference.

TECHNICAL FIELD

The disclosure relates to a field of imaging technologies, and particularly to a method and an apparatus for processing an image, and a storage medium.

BACKGROUND

High dynamic range imaging (HDRI or HDR) relates techniques used in computer graphics and cinematography for realizing a larger exposure dynamic range (i.e., larger brightness contrast) as compared to a normal digital image processing technology. One purpose of HDRI is to accurately represent a range from the greatest brilliancy of direct sunlight to shadowiness in real world.

A core idea of HDRI is that, multiple pictures with different exposure degrees for a same scene are captured and fused. At present, most of HDRI is realized based on a conventional image algorithm. A typical fusion method is to perform fusion based on the image feature pyramid. However, when processing the image with the conventional image algorithm, a fusion effect is poor for character images obtained in shadows or backlighting, such that the face may be too dark, the image may be too sharp, and the complexion may be unnatural.

SUMMARY

The present disclosure provides a method and an apparatus for processing an image, and a storage medium.

According to a first aspect of the embodiments of the disclosure, a method for processing an image is provided. The method includes: creating M first image sets based on M image frames to be processed, in which an image fame corresponds to a first image set, and each first image set comprises N sub-images to be processed that are arranged in layers based on a preset order, sub-images located in different layers have different resolution representations, in which M and N are positive integers; determining a fusion weight for each sub-image located in each layer in each first image set based on brightness information of each image frame; fusing sub-images located in each same layer in the M first image sets based on the fusion weight, to obtain N fused sub-images arranged in layers based on the preset order; adjusting a brightness of at least one fused sub-image of the N fused sub-images based on a preset brightness adjustment parameter; and obtaining a target image based on the fused sub-image after adjustment.

According to a second aspect of the embodiments of the disclosure, an apparatus for transmitting information is provided. The apparatus includes: a processor; and a memory configured to store instructions executable by a processor; the processor is configured to execute the method for processing an image as described in any of the first aspect.

According to a third aspect of the embodiments of the disclosure, a non-transitory computer readable storage medium having computer instructions stored thereon is provided. When the computer instructions are executed by a processor of an apparatus for processing an image, the processor is caused to implement the method as described in any of the first aspect.

It should be understood that, the above general descriptions and latter detailed descriptions are only illustrated and descriptive, and may not be a limitation of the disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

Reference will be made in detail to embodiments of the present disclosure. Throughout the description with reference to the accompanying drawings, unless specified or limited otherwise, the same or similar elements and the elements are denoted by the same reference numeral in different drawings. The implementations described in the following embodiments shall not be construed to represent all implementations of the present disclosure. Rather, they are merely some examples of the apparatus and method according to some aspects of the present disclosure, as described in the claims.

Figure 1:
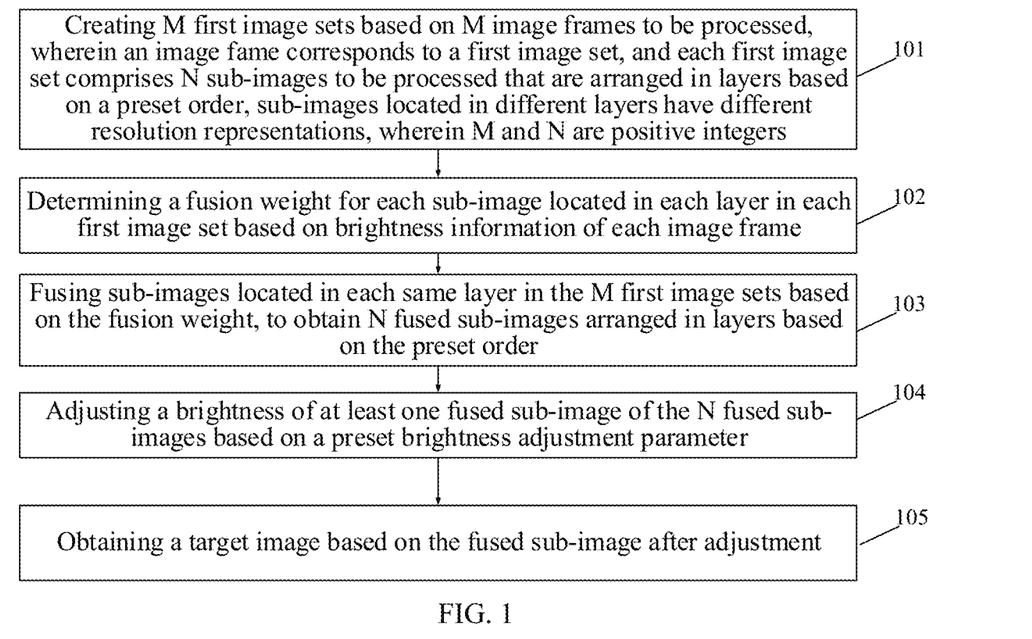
FIG. 1 is a flowchart illustrating a method for processing an image according to an embodiment.

Embodiments of the present disclosure provide a method for processing an image. FIG. 1 is a flowchart illustrating a method for processing an image according to an embodiment. As illustrated in FIG. 1, the method may include the following.

At 101, M first image sets are created based on M image frames to be processed. An image frame corresponds to a first image set. Each first image set includes N sub-images to be processed arranged in layers based on a preset order. Sub-images located in different layers may have different resolution representations. M and N are positive integers.

At 102, a fusion weight is determined for each sub-image located in each layer in each first image set based on brightness information of each image frame.

At 103, sub-images located in each same layer in the M first image sets are fused based on the fusion weight to obtain N fused sub-images arranged in layers based on the preset order.

At 104, at least one fused sub-image of the N fused sub-images is adjusted based on a preset brightness adjustment parameter.

At 105, a target image is obtained based on the fused sub-image after adjustment.

The method for processing an image provided in the embodiment may be applied to an electronic device. The electronic device may include a mobile terminal or a stationary terminal. The mobile terminal may include a mobile phone, a tablet personal computer, a notebook computer and so on. The stationary terminal may include a personal computer. In other alternative embodiments, the method may also run on a network device. The network device may include a server, a processing center and so on.

In some other embodiments, the electronic device may have an image collection component, which may be a camera having an image collection function.

In an implementation, the M image frames to be processed may be collected by the image collection component. Different image frames have different exposure degrees. In some other embodiments, another electronic device in addition to the electronic device may be used to collect the M image frames in advance. In an implementation, the M image frames collected by another electronic device may be directly inputted to the electronic device. In other words, the image frames to be processed may be collected by the image collection component of the electronic device or by another electronic device in addition to the electronic device.

Take the electronic device being a mobile phone as an example. In an implementation, the M image frames to be processed may be collected by the image collection component mounted on the mobile phone, and the M first image sets are created. In some embodiments, M may be a positive integer, for example 4, i.e., four image frames to be processed are collected.

The first image set may refer to a Laplacian Pyramid of an image frame to be processed. That is, in the embodiment, after the M image frames are obtained, the Laplacian Pyramid can be constructed for each image frame. The Laplacian Pyramid refers to an image set including a collection of images—all arising from a single image frame (original image)—that are successively downsampled.

Figure 2:
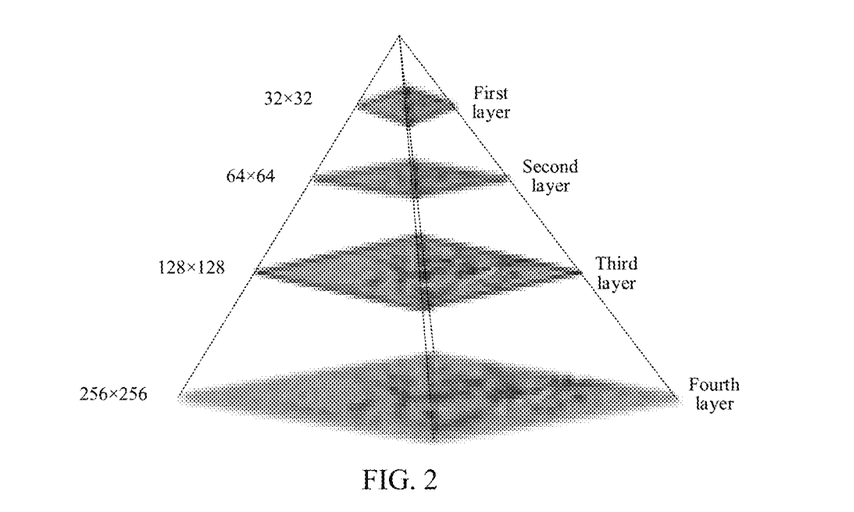
FIG. 2 is a schematic diagram illustrating a Laplacian Pyramid according to an embodiment.

FIG. 2 is a schematic diagram illustrating a Laplacian Pyramid according to an embodiment. As illustrated in FIG. 2, the Laplacian Pyramid represents the first image set, in which N=4. The bottom of the Laplacian Pyramid refers to a high resolution representation of the image frame, and the top refers to a low resolution representation. The first layer (the top) has the resolution of 32*32, the second layer has the resolution of 64*64, the third layer has the resolution of 128*128 and the fourth layer (the bottom) has the resolution of 256*256.

In some embodiments, Gaussian smooth processing is performed on the image frame to be processed firstly, and the Laplacian Pyramid of the image frame can be obtained by successively downsampling after the Gaussian smooth processing.

In the embodiment, after the first image set is obtained, the fusion weight of each sub-image located in each layer in the first image set may be determined based on the brightness information of the image frame. The brightness information may include a brightness, a contrast, a saturability of the image frame or the like. For example, the fusion weight of each sub-image located in each layer in the first image set may be calculated based on the brightness, the contrast, the saturability of the image frame. For example, the fusion weight of the sub-image located in each layer may be calculated respectively. Or, the fusion weight of the sub-image located in the layer having the maximum resolution may be calculated and the fusion weights of the sub-image located in other layers are obtained by downsampling.

In some embodiments, after the fusion weight of each sub-image located in each layer in the first image set is obtained, the fusion weights of the sub-images located in respective layers may be normalized. In some embodiment, a weighting curve may be a Gaussian curve of different means and variances. In some other embodiments, after the normalization of the fusion weights, the sub-images located in the same layer correspond to a fusion weight, such that the Gaussian Pyramid of weights based on the fusion weight of the sub-image located in each layer. M image frames correspond to the Gaussian Pyramid with M weights.

In the embodiment, after the fusion weight of each sub-image located in each layer in each first image set, the sub-images located in the same layer in the M first image sets may be fused based on the fusion weight of each sub-image to obtain the N fused sub-images arranged in layers based on the preset order, such that features and details of different image frames can be fused.

For example, the sub-images located in each same layer in the first image sets are weighted based on the fusion weights and the weighted sub-images are summed to obtain the fused sub-image of each layer, such that the Laplacian Pyramid can be obtained. For example, when M=3 and N=4, the sub-images located in the first layer in the three first image sets (i.e., the sub-image located in the first layer in the first image set, the sub-image located in the first layer in the second first image set, the sub-image located in the first layer in the third first image set, the sub-image located in the first layer in the fourth first image set) are weighted based on the fusion weights of the sub-images located in the first layer and the weighted sub-images located in the first layer are summed to obtain the fused sub-image of the first layer, the sub-images located in the second layer in the three first image sets are weighted based on the fusion weights of the sub-images located in the second layer and the weighted sub-images located in the second layer are summed to obtain the fused sub-image of the second layer, and so on. In the disclosure, the weighted summing can be performed for each layer of the Gaussian Pyramid of weights and the Laplacian Pyramid of the image frame to be processed, to obtain the Laplacian Pyramid of the fused image.

In the embodiment, in a process of fusing the sub-images located in the same layer in the M first image sets based on the fusion weight of each sub-image, the brightness of at least one fused sub-image of the N fused sub-image may be adjusted based on the preset brightness adjustment parameter, and the target image is obtained based on the fused sub-image after adjustment.

In some other embodiments, after fusing the sub-images located in the same layer in the M first image sets based on the fusion weight of each sub-image, the brightness of at least one fused sub-image of the N fused sub-image may be adjusted based on the preset brightness adjustment parameter, and the target image is obtained based on the fused sub-image after adjustment.

In the embodiment, after fusing the image frames to be processed and obtaining the fused sub-images, the brightness of the fused sub-image may be adjusted based on the preset brightness adjustment parameter, for example, brightness enhancement processing can be performed on the fused sub-image based on the brightness adjustment parameter, or the brightness of the fused sub-image can be decreased based on the brightness adjustment parameter. In this way, during construction of the target image based on the fused sub-image after adjustment, the obtained target image may have a more suitable brightness. In some embodiments, adjusting the brightness of the at least one fused sub-image of the N fused sub-images based on the preset brightness adjustment parameter includes: adjusting the brightness of the fused sub-image located in an (N−1)-th layer based on the preset brightness adjustment parameter.

Take N=4 as an example. As illustrated in FIG. 2, the brightness of the fused sub-image located in the last second layer ((N−1)-th layer) in FIG. 2 may be adjusted. Since the last second layer has a higher resolution, the brightness of the fused sub-image with a high resolution can be adjusted, such that the target image with a higher definition may be obtained on the premise that the target image has a more suitable brightness, compared to adjusting the brightness of the fused sub-image with a lower resolution.

In some other embodiments, the brightness of the fused sub-image located in the (N−2)-th layer or in the (N−3)-th layer may be adjusted. Or, both the brightness of the fused sub-image located in the (N−1)-th layer and the brightness of the fused sub-image located in the (N−2)-th layer may be adjusted. A specific adjustment may be set according to the layer of the fused sub-image or according to actual needs, which is not limited herein.

In some embodiments, the method may further include sequencing the M image frames based on the brightness information of each image frame; determining a normal exposed image from the M image frame based on a sequenced result; and determining the brightness adjustment parameter based on the brightness information of the normal exposed image and brightness information of the fused sub-image to be adjusted.

After obtaining the M image frames, the M image frames may be sequenced based on the brightness information of each image frame, and the normal exposed image may be determined from the M image frames according to the sequenced result. The brightness information may include a brightness, a contrast, a saturability of the image frame or the like.

For example, the brightness information is the brightness of the image frame to be processed. The M image frames may be sequenced based on the brightness of each image frame, and the normal exposed image may be determined from the image frames based on the sequenced result. For example, the image frame located at a preset position may be determined as the normal exposed image. The preset position may include a middle position or the like. In some embodiments, the preset position may be set according to actual needs, for example according to experiences or historical data.

Take M=5 as an example, i.e., there are five image frames to be processed. The brightness of the first image frame is 5 lux, the brightness of the second image frame is 4 lux, the brightness of the third image frame is 7 lux, the brightness of the fourth image frame is 2 lux, and the brightness of the fifth image frame is 3 lux. Since the second image frame is located at the middle position after sequencing the five image frames based on the brightness, so the second image frame may be determined as the normal exposed image.

In the embodiment, after the normal exposed image is determined, the brightness adjustment parameter may be determined based on the brightness information of the normal exposed image and the brightness information of the fused sub-image to be adjusted currently. The fused sub-image to be adjusted currently may be the fused sub-image located in the (N−1)-th layer, or may be the fused sub-image located in another layer, which is not limited herein.

In the embodiment, the brightness of the image frame located at the preset position has a suitable brightness. By determining the image frame located at the preset position as the normal exposed image and determining the brightness adjustment parameter based on the brightness information of the normal exposed image and the brightness information of the fused sub-image to be adjusted currently, the brightness adjustment parameter may be more accurate.

In some other embodiments, a mapping relation between the brightness information of the normal exposed image and the brightness information of the fused sub-image to be adjusted may be established in advance. In an implementation, if the normal exposed image is determined, the brightness adjustment parameter may be determined based on the brightness information of the normal exposed image and the mapping relation, and the brightness information of the fused sub-image to be adjusted can be adjusted based on the brightness adjustment parameter.

In some embodiments, determining the brightness adjustment parameter based on the brightness information of the normal exposed image and the brightness information of the fused sub-image to be adjusted includes determining a first average brightness of image regions in the normal exposed image and a second average brightness of image regions of the fused sub-image to be adjusted; and determining the brightness adjustment parameter based on the first average brightness and the second average brightness.

The first average brightness of the image regions in the normal exposed image and the second average brightness of the image regions in the fused sub-image to be adjusted currently may be determined, and the brightness adjustment parameter may be determined based on the first average brightness and the second average brightness. By calculating the average brightness, the brightness adjustment parameter may be more equilibrious, such the fused sub-image after adjustment may have a more suitable brightness.

In some other embodiments, a third average brightness of a first target region (for example, a region containing a human face) in the normal exposed image may be determined based on an image processing algorithm, a fourth average brightness of a second target region (for example, a region containing a human face) in the fused sub-image to be adjusted currently may be determined based on the image processing algorithm, and the brightness adjustment parameter may be determined based on the third average brightness and the fourth average brightness. In this way, the brightness of the target region may be adjusted, for example, the brightness of the human face may be adjusted, such that the brightness of the target region may be more natural.

In some embodiments, determining the brightness adjustment parameter based on the first average brightness and the second average brightness includes determining a difference between the first average brightness and the second average brightness as the brightness adjustment parameter.

In the embodiment, after determining the difference between the first average brightness and the second average brightness as the brightness adjustment parameter, when the brightness of the at least one fused sub-image of the N fused sub-images is adjusted based on the brightness adjustment parameter, a summation calculation is performed based on the brightness of the at least one fused sub-image and the brightness adjustment parameter to obtain a target brightness, and the brightness of the at least one fused sub-image is adjusted to the target brightness. That is, the brightness of the fused sub-image may be adjusted to the brightness of the normal exposed image.

In some embodiments, obtaining the target image based on the fused sub-image after adjustment includes performing superposition processing on the fused sub-images arranged in layers after adjusting the brightness of the at least one fused sub-image of the N fused sub-images, to obtain a fused image; and fusing the fused image and the normal exposed image to obtain the target image.

After adjusting the brightness of the at least one fused sub-image of the N fused sub-images, the Laplacian Pyramid of the fused image may be obtained. A layer by layer recurrence is performed from the top of the Laplacian Pyramid, and the fused image may be obtained by performing the following operation starting from the layer with the minimum resolution (i.e., the first uppermost layer) to the second lowest layer: superposing feature of the current layer after performing upsampling on the current layer and feature of a next lower layer.

Figure 3:
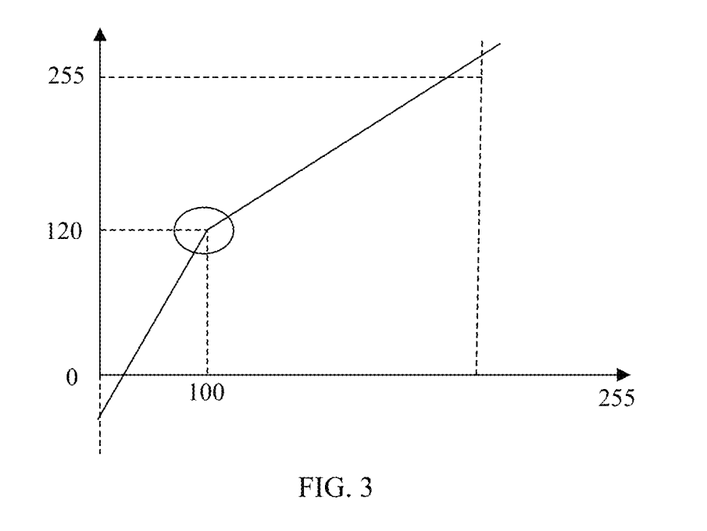
FIG. 3 is a schematic diagram illustrating a linear segment according to an embodiment.

In the embodiment, during reconstruction of the fused image, segment-wise linearization brightness enhancement may be performed on the fused sub-image in a certain layer (e.g., (N−1)-th layer). FIG. 3 is a schematic diagram illustrating a linear segment according to an embodiment. As illustrated in FIG. 3, the abscissa represents the brightness of the fused sub-image to be adjusted, and the ordinate represents the brightness of the normal exposed image. In the embodiment, segment-wise linearization mapping may be performed on the fused sub-image to be adjusted, so that the fused sub-image to be adjusted may have a more suitable brightness. During the segment-wise linearization brightness enhancement, a junction of the segments may be determined based on an average brightness of the human face region in the fused sub-image to be adjusted and an average brightness of the human face region in the normal exposed image, and the brightness of the fused sub-image to be adjusted may be adjusted after the junction. For example, the brightness of the fused sub-image to be adjusted may be adjusted to the brightness of the normal exposed image.

In some other embodiments, a mapping relation between the brightness information of the normal exposed image and the brightness information of the fused sub-image to be adjusted may be established in advance. In an implementation, if the normal exposed image is determined, the brightness adjustment parameter may be determined based on the brightness information of the normal exposed image and the mapping relation, and the brightness information of the fused sub-image to be adjusted can be adjusted based on the brightness adjustment parameter.

The mapping relation between the brightness information of the normal exposed image and the brightness information of the fused sub-image to be adjusted may be expressed by the following formula:

$$y=ax+b \quad (1).$$

In formula (1), y represents the brightness information of the fused sub-image to be adjusted, x represents the brightness information of the normal exposed image, a represent a varying coefficient, and b represent a constant term.

a and b can be set according to actual needs, for example a=1, b=0. When a=1 and b=0, the brightness information of the fused sub-image to be adjusted may be adjusted to be the same as the brightness information of the normal exposed image.

In the embodiment, after the fused image is obtained, the fused image and the normal exposed image may be fused to obtain the target image. For example, the Laplacian Pyramid of the fused image and the Laplacian Pyramid of the normal exposed image may be constructed, the fusion weights of the fused sub-images located in respective layers in the Laplacian Pyramid may be obtained based on the brightness information of the fused image and the brightness information of the normal exposed image, and the target image may be obtained by performing weighed fusion on the fused image and the normal exposed image based on the fusion weights of the fused sub-images. In this way, the features and details of the fused image and the normal exposed image may be fused to enable the target image to be more natural.

Figure 4:
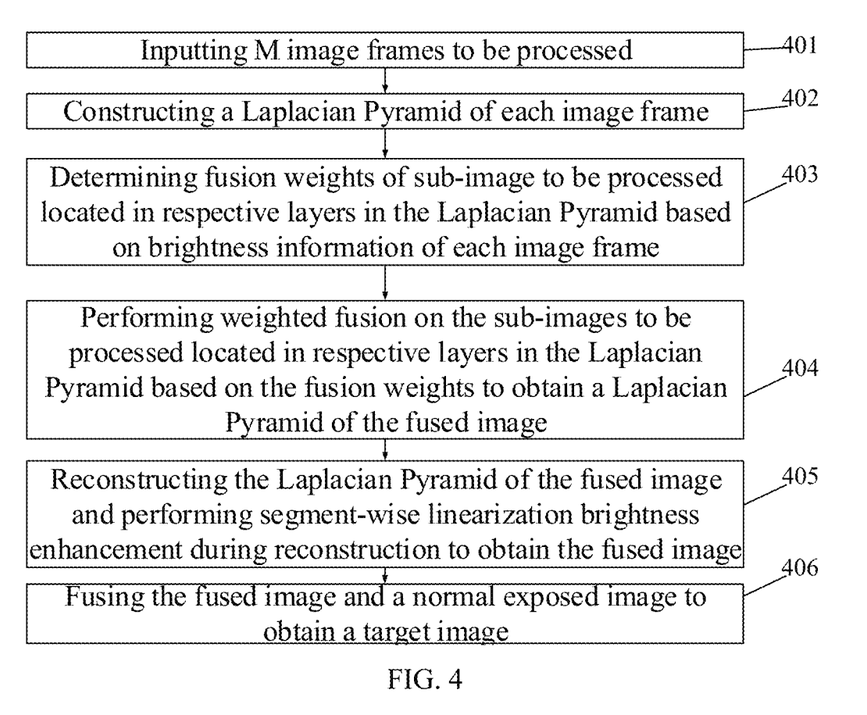
FIG. 4 is a flowchart illustrating another method for processing an image according to an embodiment.

FIG. 4 is a flowchart illustrating another method for processing an image according to an embodiment. As illustrated in FIG. 4, the method may include the following.

At 401, M image frames to be processed are inputted.

In an implementation, the M image frames to be processed may be collected by an image collection component. Different image frames have different exposure degrees. In some other embodiments, another electronic device in addition to the electronic device may be used to collect the M image frames in advance. In an implementation, the M image frames collected by another electronic device may be directly inputted to the electronic device. In other words, the image frames to be processed may be collected by the image collection component of the electronic device or by another electronic device in addition to the electronic device.

At 402, a Laplacian Pyramid of each image frame is constructed.

In the embodiment, after obtaining the M image frames, the Laplacian Pyramid may be constructed for each image frame. The Laplacian Pyramid refers to an image set including a collection of images—all arising from a single image frame (original image)—that are successively downsampled.

At 403, fusion weights of sub-image to be processed located in respective layers in the Laplacian Pyramid are determined based on brightness information of each image frame.

The brightness information may include a brightness, a contrast, a saturability of the sub-image to be processed or the like. For example, the fusion weight of each sub-image located in each layer in the first image set may be calculated based on the brightness, the contrast, the saturability of the image frame. For example, the fusion weight of the sub-image located in each layer may be calculated respectively. Or, the fusion weight of the sub-image located in the layer having the maximum resolution may be calculated and the fusion weights of the sub-image located in other layers are obtained by downsampling.

At 404, weighted fusion is performed on the sub-images to be processed located in respective layers in the Laplacian Pyramid based on the fusion weights to obtain a Laplacian Pyramid of the fused image.

In the embodiment, after the fusion weights of the sub-images located in respective layers in the first image sets, the sub-images located in the same layer in the M first image sets may be fused based on the fusion weights to obtain the N fused sub-images arranged in layers based on the preset order, such that features and details of different image frames can be fused.

At 405, the Laplacian Pyramid of the fused image is reconstructed and segment-wise linearization brightness enhancement is performed during reconstruction to obtain the fused image.

In the embodiment, in a process of fusing the sub-images located in the same layer in the M first image sets based on the fusion weight of each sub-image, a brightness of at least one fused sub-image of the N fused sub-image may be adjusted based on a preset brightness adjustment parameter, and the fused image is obtained based on the fused sub-image after adjustment.

At 406, the fused image and a normal exposed image are fused to obtain a target image.

In the embodiment, the fused image is obtained, the fused image and the normal exposed image may be fused to obtain the target image. For example, the Laplacian Pyramid of the fused image and the Laplacian Pyramid of the normal exposed image may be constructed, the fusion weights of the fused sub-images located in respective layers in the Laplacian Pyramid may be obtained based on the brightness information of the fused image and the brightness information of the normal exposed image, and the target image may be obtained by performing weighed fusion on the fused image and the normal exposed image based on the fusion weights of the fused sub-images. In this way, the features and details of the fused image and the normal exposed image may be fused to enable the target image to be more natural.

Figure 5:
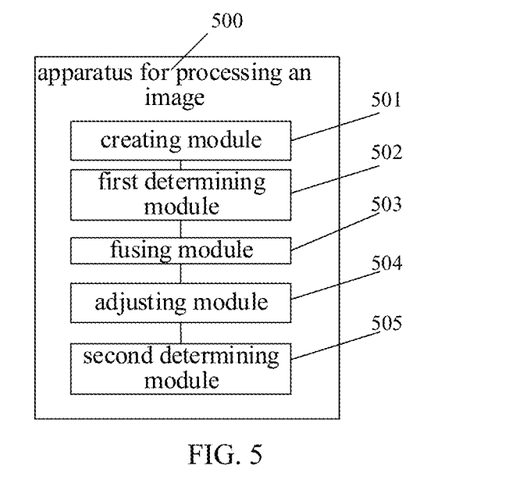
FIG. 5 is a block diagram illustrating an apparatus for processing an image according to an embodiment.

FIG. 5 is a block diagram illustrating an apparatus for processing an image according to an embodiment. As illustrated in FIG. 5, the apparatus 500 may be applied to an electronic device. The apparatus may include a creating module 501, a first determining module 502, a fusing module 503, an adjusting module 504 and a second determining module 505.

The creating module 501 is configured to create M first image sets based on M image frames to be processed, in which an image fame corresponds to a first image set, and each first image set comprises N sub-images to be processed that are arranged in layers based on a preset order, sub-images located in different layers have different resolution representations, in which M and N are positive integers.

The first determining module 502 is configured to determine a fusion weight for each sub-image located in each layer in each first image set based on brightness information of each image frame.

The fusing module 503 is configured to fuse sub-images located in each same layer in the M first image sets based on the fusion weight, to obtain N fused sub-images arranged in layers based on the preset order.

The adjusting module 504 is configured to adjust a brightness of at least one fused sub-image of the N fused sub-images based on a preset brightness adjustment parameter.

The second determining module 505 is configured to obtain a target image based on the fused sub-image after adjustment.

In some embodiments, the apparatus 500 further includes a sequencing module, configured to sequence the M image frames based on the brightness information of each image frame; a third determining module, configured to determine a normal exposed image from the M image frame based on a sequenced result; and a fourth determining module, configured to determine the brightness adjustment parameter based on the brightness information of the normal exposed image and brightness information of the fused sub-image to be adjusted.

In some embodiments, the fourth determining module is further configured to: determine a first average brightness of image regions in the normal exposed image and a second average brightness of image regions of the fused sub-image to be adjusted; and determine the brightness adjustment parameter based on the first average brightness and the second average brightness.

In some embodiments, the fourth determining module is further configured to: determine a difference between the first average brightness and the second average brightness as the brightness adjustment parameter.

In some embodiments, the second determining module 505 is further configured to: perform superposition processing on the fused sub-images arranged in layers after adjusting the brightness of the at least one fused sub-image of the N fused sub-images, to obtain a fused image; and fuse the fused image and the normal exposed image to obtain the target image.

In some embodiments, the adjusting module 504 is further configured to adjust the brightness of the fused sub-image located in an (N−1)-th layer based on the preset brightness adjustment parameter.

Regarding the apparatus in the above embodiments, the specific manner in which each module performs operation has been described in detail in the method embodiments, and detailed description are not given here.

Figure 6:
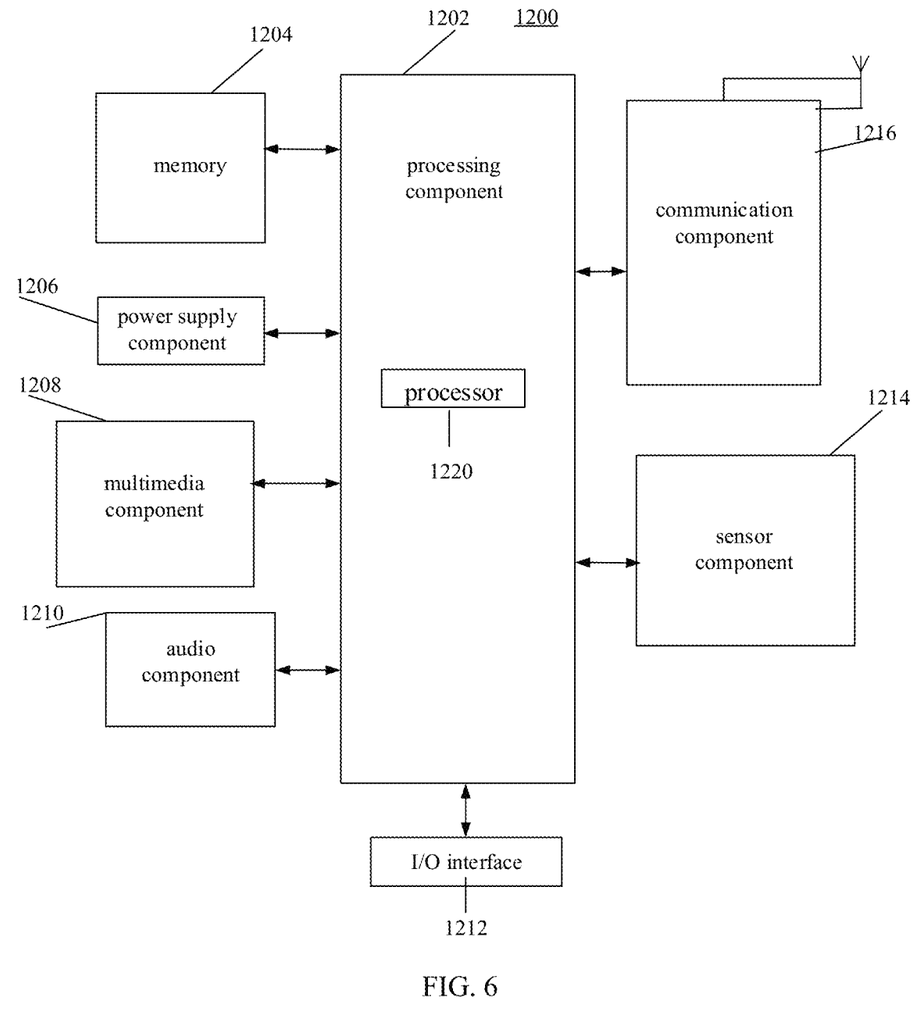
FIG. 6 is a block diagram illustrating an apparatus 1200 for transmitting information according to an embodiment.

FIG. 6 is a block diagram illustrating an apparatus 1200 for processing an image according to an embodiment. The apparatus 1200 may be a mobile phone, a computer, a digital broadcasting terminal, a message transceiver device, a game console, a tablet device, a medical device, a fitness device and a personal digital assistant.

Referring to FIG. 6, the apparatus 1200 may include one or more components: a processing component 1202, a memory 1204, a power supply component 1206, a multimedia component 1208, an audio component 1210, an input/output (I/O) interface 1212, a sensor component 1214, and a communication component 1216.

The processing component 1202 generally controls the overall operation of the apparatus 1200, such as the operations related to display, phone call, data communication, camera operation and recording operation. The processing component 1202 may include one or more processors 1220 to perform instructions, to complete all or part of blocks of the above method. In addition, the processing component 1202 may include one or more modules for the convenience of interaction between the processing component 1202 and other components. For example, the processing component 1202 may include a multimedia module for the convenience of interaction between the multimedia component 808 and the processing component 1202.

The memory 1204 is configured to store all types of data to support the operation of the apparatus 1200. Examples of the data include the instructions of any applications or methods operated on the apparatus 1200, contact data, phone book data, messages, pictures, videos, etc. The memory 1204 may be implemented by any type of volatile or non-volatile storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 1206 may provide power supply for all components of the apparatus 1200. The power supply component 1206 may include a power supply management system, one or more power supplies, and other components related to generating, managing and distributing power for the apparatus 1200.

The multimedia component 1208 includes a screen of an output interface provided between the apparatus 1200 and the user. In some embodiments, a screen may include a liquid crystal display (LCD) and a touch panel (TP). When the screen includes a TP, the screen may be implemented as a touch screen to receive an input signal from the user. The touch panel includes one or more touch sensors to sense touching, sliding and gestures on the touch panel. The touch sensor may not only sense the boundary of touch or slide action, but also detect the duration and pressure related to the touching or sliding operation. In some embodiments, the multimedia component 1208 includes a front camera and/or a rear camera. When the apparatus 1200 is in an operation mode, such as a shooting mode or a video mode, the front camera and/or the rear camera may receive external multimedia data. Each front camera and rear camera may be a fixed optical lens system or an optical lens system with a focal length and an optical zoom capacity.

The audio component 1210 is configured to output and/or input a signal. For example, the audio component 1210 includes a microphone (MIC). When the apparatus 1200 is in an operation mode, such as a call mode, a record mode, and a speech recognition mode, the microphone is configured to receive an external audio signal. The audio signal received may be further stored in the memory 1204 or sent via the communication component 1216. In some embodiments, the audio component 1210 further includes a speaker configured to output an audio signal.

The I/O interface 1212 provides an interface for the processing component 1202 and the peripheral interface module, and the peripheral interface module may be a keyboard, a click wheel, a button, etc. The button may include but not limited to a home button, a volume button, a start button and a lock button.

The sensor component 1214 includes one or more sensors configured to provide various aspects of status assessments for the apparatus 1200. For example, the sensor component 1214 may detect the on/off state of the apparatus 1200 and the relative positioning of the component, for example, the component is a display and a keypad of the apparatus 1200. The sensor component 1214 may further detect the position change of the apparatus 1200 or one component of the apparatus 1200, the presence or absence of contact between the user and the apparatus 1200, the orientation or acceleration/deceleration of the apparatus 1200, and the temperature change of the apparatus 1200. The sensor component 1214 may include a proximity sensor configured to detect the existence of the objects nearby without any physical contact. The sensor component 1214 may further include a light sensor such as CMOS or CCD image sensor, which is configured to use in imaging applications. In some embodiments, the sensor component 1214 may further include an acceleration transducer, a gyroscope sensor, a magnetic sensor, a pressure sensor or a temperature sensor.

The communication component 1216 is configured for the convenience of wireless communication between the apparatus 1200 and other devices. In embodiments of the disclosure, the communication component 1216 may access wireless networks based on communication standard, such as 2G, 3G, 4G or 5G, or their combination to achieve random access. In an example embodiment, the communication component 1216 receives a broadcast signal or broadcast-related information from an external broadcast management system via a broadcast channel In at least one embodiment, the communication component 1216 may further include an NFC module.

In an example embodiment, the apparatus 1200 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to execute the above method for transmitting information.

In an example embodiment, a non-temporary computer readable storage medium is further provided which includes instructions, such as the memory 1204 including instructions, the instructions may be executed by the processor 1220 of the apparatus 1200 to execute the above method for transmitting information. For example, the non-transitory computer readable storage medium may be a ROM, a random access memory (RANI), a CD-ROM, a magnetic tape, a floppy disk, an optical data storage device, etc.

A non-transitory computer-readable storage medium is provided. When instructions in the storage medium are executed by a processor of an apparatus for processing an image, a method for processing an image may be performed. The method includes creating M first image sets based on M image frames to be processed, in which an image fame corresponds to a first image set, and each first image set comprises N sub-images to be processed that are arranged in layers based on a preset order, sub-images located in different layers have different resolution representations, in which M and N are positive integers; determining a fusion weight for each sub-image located in each layer in each first image set based on brightness information of each image frame; fusing sub-images located in each same layer in the M first image sets based on the fusion weight, to obtain N fused sub-images arranged in layers based on the preset order; adjusting a brightness of at least one fused sub-image of the N fused sub-images based on a preset brightness adjustment parameter; and obtaining a target image based on the fused sub-image after adjustment.

Figure 7:
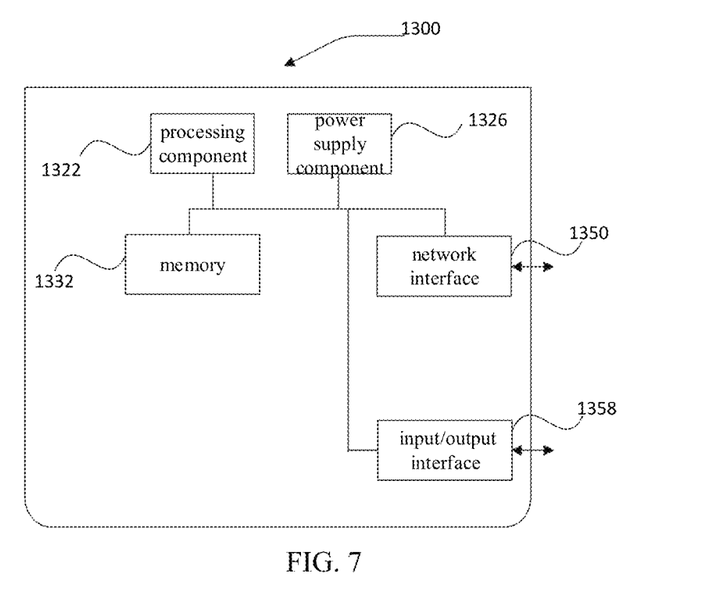
FIG. 7 is a block diagram illustrating an apparatus 1300 for transmitting information according to an embodiment.

FIG. 7 is a block diagram illustrating an apparatus 1300 for processing an image according to an embodiment. For example, the apparatus 1300 may be server. Referring to FIG. 7, the apparatus 1300 may include a processing component 1322, which further includes one or more processors, and a memory resource represented by a memory 1332, for storing instructions that may be executed by the processing component 1322, such as an application program. The application program stored in the memory 1332 may include one or more modules each corresponding to a set of instructions. In addition, the processing component 1322 is configured to execute instructions to execute the aforementioned method. The method includes creating M first image sets based on M image frames to be processed, in which an image fame corresponds to a first image set, and each first image set comprises N sub-images to be processed that are arranged in layers based on a preset order, sub-images located in different layers have different resolution representations, in which M and N are positive integers; determining a fusion weight for each sub-image located in each layer in each first image set based on brightness information of each image frame; fusing sub-images located in each same layer in the M first image sets based on the fusion weight, to obtain N fused sub-images arranged in layers based on the preset order; adjusting a brightness of at least one fused sub-image of the N fused sub-images based on a preset brightness adjustment parameter; and obtaining a target image based on the fused sub-image after adjustment.

The apparatus 1300 may also include a power supply component 1326 configured to perform power management of the apparatus 1300, a wired or wireless network interface 1350 configured to connect the apparatus 1300 to a network, and an input output (I/O) interface 1358. The apparatus 1300 may operate based on an operating system stored in the memory 1332, such as a Windows Server™, a Mac OS X™, a Unix™, a Linux™, a FreeBSD™ or the like.

Those skilled in the art will easily think of other embodiments of the present disclosure after considering the specification and practicing the present disclosure. This application is intended to cover any variations, uses, or adaptive changes of the present disclosure. These variations, uses, or adaptive changes follow the general principles of the present disclosure and include common knowledge or conventional technical means in the technical field not disclosed in the present disclosure. The description and the embodiments are only regarded as exemplary, and the true scope and spirit of the present disclosure are pointed out by the appended claims.

It should be understood that the present disclosure is not limited to the precise structure that has been described above and shown in the drawings, and various modifications and changes may be made without departing from its scope. The scope of the present disclosure is only limited by the appended claims.

What is claimed is:

1. A method for processing an image, comprising:
    creating M first image sets based on M image frames to be processed, wherein an image fame corresponds to a first image set, and each first image set comprises N sub-images to be processed that are arranged in layers based on a preset order, sub-images located in different layers have different resolution representations, wherein M and N are both positive integers;
    determining a fusion weight for each sub-image located in each layer in each first image set based on brightness information of each image frame;
    fusing sub-images located in each same layer in the M first image sets based on the fusion weight, to obtain N fused sub-images arranged in layers based on the preset order;
    adjusting a brightness of at least one fused sub-image of the N fused sub-images based on a preset brightness adjustment parameter; and
    obtaining a target image based on the fused sub-image after adjustment.

2. The method of claim 1, further comprising:
    sequencing the M image frames based on the brightness information of each image frame;
    determining a normal exposed image from the M image frame based on a sequenced result; and
    determining the brightness adjustment parameter based on the brightness information of the normal exposed image and brightness information of the fused sub-image to be adjusted.

3. The method of claim 2, wherein, determining the brightness adjustment parameter based on the brightness information of the normal exposed image and the brightness information of the fused sub-image to be adjusted comprises:
    determining a first average brightness of image regions in the normal exposed image and a second average brightness of image regions of the fused sub-image to be adjusted; and
    determining the brightness adjustment parameter based on the first average brightness and the second average brightness.

4. The method of claim 2, wherein, determining the brightness adjustment parameter based on the brightness information of the normal exposed image and the brightness information of the fused sub-image to be adjusted comprises:
    determining a third average brightness of a target region in the normal exposed image and a third average brightness of a target region of the fused sub-image to be adjusted; and
    determining the brightness adjustment parameter based on the third average brightness and the fourth average brightness.

5. The method of claim 3, wherein, determining the brightness adjustment parameter based on the first average brightness and the second average brightness comprises:
    determining a difference between the first average brightness and the second average brightness as the brightness adjustment parameter.

6. The method of claim 2, wherein, obtaining the target image based on the fused sub-image after adjustment comprises:
    performing superposition processing on the fused sub-images arranged in layers after adjusting the brightness of the at least one fused sub-image of the N fused sub-images, to obtain a fused image; and
    fusing the fused image and the normal exposed image to obtain the target image.

7. The method of claim 1, wherein, adjusting the brightness of the at least one fused sub-image of the N fused sub-images based on the preset brightness adjustment parameter comprises:
    adjusting the brightness of the fused sub-image located in an (N−1)-th layer based on the preset brightness adjustment parameter.

8. An apparatus for processing an image, comprising:
    a processor; and
    a memory configured to store instructions executable by the processor;
    wherein, the processor is configured to execute a method for processing an image, comprising:
    creating M first image sets based on M image frames to be processed, wherein an image fame corresponds to a first image set, and each first image set comprises N sub-images to be processed that are arranged in layers based on a preset order, sub-images located in different layers have different resolution representations, wherein M and N are positive integers;
    determining a fusion weight for each sub-image located in each layer in each first image set based on brightness information of each image frame;
    fusing sub-images located in each same layer in the M first image sets based on the fusion weight, to obtain N fused sub-images arranged in layers based on the preset order;
    adjusting a brightness of at least one fused sub-image of the N fused sub-images based on a preset brightness adjustment parameter; and
    obtaining a target image based on the fused sub-image after adjustment.

9. The apparatus of claim 8, wherein the processor is configured to perform the following:
    sequencing the M image frames based on the brightness information of each image frame;
    determining a normal exposed image from the M image frame based on a sequenced result; and
    determining the brightness adjustment parameter based on the brightness information of the normal exposed image and brightness information of the fused sub-image to be adjusted.

10. The apparatus of claim 9, wherein, determining the brightness adjustment parameter based on the brightness information of the normal exposed image and the brightness information of the fused sub-image to be adjusted comprises:
   determining a first average brightness of image regions in the normal exposed image and a second average brightness of image regions of the fused sub-image to be adjusted; and
   determining the brightness adjustment parameter based on the first average brightness and the second average brightness.

11. The apparatus of claim 9, wherein, determining the brightness adjustment parameter based on the brightness information of the normal exposed image and the brightness information of the fused sub-image to be adjusted comprises:
   determining a third average brightness of a target region in the normal exposed image and a third average brightness of a target region of the fused sub-image to be adjusted; and
   determining the brightness adjustment parameter based on the third average brightness and the fourth average brightness.

12. The apparatus of claim 10, wherein, determining the brightness adjustment parameter based on the first average brightness and the second average brightness comprises:
   determining a difference between the first average brightness and the second average brightness as the brightness adjustment parameter.

13. The apparatus of claim 9, wherein, obtaining the target image based on the fused sub-image after adjustment comprises:
   performing superposition processing on the fused sub-images arranged in layers after adjusting the brightness of the at least one fused sub-image of the N fused sub-images, to obtain a fused image; and
   fusing the fused image and the normal exposed image to obtain the target image.

14. The apparatus of claim 8, wherein, adjusting the brightness of the at least one fused sub-image of the N fused sub-images based on the preset brightness adjustment parameter comprises:
   adjusting the brightness of the fused sub-image located in an (N−1)-th layer based on the preset brightness adjustment parameter.

15. A non-transitory computer readable storage medium having computer instructions stored thereon, wherein when the computer instructions are executed by a processor, the processor is caused to implement a method for processing an image, comprising:
   creating M first image sets based on M image frames to be processed, wherein an image fame corresponds to a first image set, and each first image set comprises N sub-images to be processed that are arranged in layers based on a preset order, sub-images located in different layers have different resolution representations, wherein M and N are positive integers;
   determining a fusion weight for each sub-image located in each layer in each first image set based on brightness information of each image frame;
   fusing sub-images located in each same layer in the M first image sets based on the fusion weight, to obtain N fused sub-images arranged in layers based on the preset order;
   adjusting a brightness of at least one fused sub-image of the N fused sub-images based on a preset brightness adjustment parameter; and
   obtaining a target image based on the fused sub-image after adjustment.

16. The non-transitory computer readable storage medium of claim 15, wherein the processor is configured to perform the following:
   sequencing the M image frames based on the brightness information of each image frame;
   determining a normal exposed image from the M image frame based on a sequenced result; and
   determining the brightness adjustment parameter based on the brightness information of the normal exposed image and brightness information of the fused sub-image to be adjusted.

17. The non-transitory computer readable storage medium of claim 16, wherein, determining the brightness adjustment parameter based on the brightness information of the normal exposed image and the brightness information of the fused sub-image to be adjusted comprises:
   determining a first average brightness of image regions in the normal exposed image and a second average brightness of image regions of the fused sub-image to be adjusted; and
   determining the brightness adjustment parameter based on the first average brightness and the second average brightness.

18. The non-transitory computer readable storage medium of claim 17, wherein, determining the brightness adjustment parameter based on the first average brightness and the second average brightness comprises:
   determining a difference between the first average brightness and the second average brightness as the brightness adjustment parameter.

19. The non-transitory computer readable storage medium of claim 16, wherein, obtaining the target image based on the fused sub-image after adjustment comprises:
   performing superposition processing on the fused sub-images arranged in layers after adjusting the brightness of the at least one fused sub-image of the N fused sub-images, to obtain a fused image; and
   fusing the fused image and the normal exposed image to obtain the target image.

20. The non-transitory computer readable storage medium of claim 15, wherein, adjusting the brightness of the at least one fused sub-image of the N fused sub-images based on the preset brightness adjustment parameter comprises:
   adjusting the brightness of the fused sub-image located in an (N−1)-th layer based on the preset brightness adjustment parameter.

* * * * *